US011969902B1

(12) United States Patent
Ebrahimi Afrouzi

(10) Patent No.: US 11,969,902 B1
(45) Date of Patent: Apr. 30, 2024

(54) METHOD FOR ROBOTIC DEVICES TO INTERACT WITH EACH OTHER

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 62 days.

(21) Appl. No.: 17/494,687

(22) Filed: Oct. 5, 2021

Related U.S. Application Data

(63) Continuation of application No. 16/568,367, filed on Sep. 12, 2019, now abandoned, which is a continuation of application No. 15/986,670, filed on May 22, 2018, now abandoned.

(60) Provisional application No. 62/509,585, filed on May 22, 2017.

(51) Int. Cl.
 *B25J 9/16* (2006.01)
 *H04L 67/125* (2022.01)

(52) U.S. Cl.
 CPC .......... *B25J 9/1682* (2013.01); *B25J 9/1669* (2013.01); *H04L 67/125* (2013.01)

(58) Field of Classification Search
 CPC ..... B25J 9/1682; B25J 9/1669; G05D 1/0027; G05D 1/0088; G05D 2201/0215; H04L 63/08; H04L 67/125; H04W 4/70
 See application file for complete search history.

(56) References Cited

U.S. PATENT DOCUMENTS

| | | | |
|---|---|---|---|
| 7,024,564 B2 | 4/2006 | Pavlin | |
| 9,128,486 B2* | 9/2015 | Chiappetta | G05D 1/0272 |
| 10,096,067 B1* | 10/2018 | Slusar | G06Q 40/08 |
| 2002/0095239 A1* | 7/2002 | Wallach | G05D 1/0295 |
| | | | 700/245 |
| 2004/0128586 A1* | 7/2004 | Bahr | H04L 41/0233 |
| | | | 714/E11.023 |

(Continued)

FOREIGN PATENT DOCUMENTS

| | | |
|---|---|---|
| CN | 106203019 A | 7/2016 |
| CN | 106529251 A | 10/2016 |

(Continued)

OTHER PUBLICATIONS

U.S. Appl. No. 14/820,505, filed Aug. 6, 2015, Afrouzi; Ali.

*Primary Examiner* — Jeff A Burke
*Assistant Examiner* — Kyle T Johnson

(57) ABSTRACT

Included is a method for a first robotic device to collaborate with a second robotic device, including: actuating, with a processor of the first robotic device, the first robotic device to execute a first part of a cleaning task; transmitting, with the processor of the first robotic device, information to a processor of the second robotic device upon completion of the first part of the cleaning task; receiving, with the processor of the second robotic device, the information transmitted from the processor of the first robotic device; and actuating, with the processor of the second robotic device, the second robotic device to execute a second part of the cleaning task upon receiving the signal; wherein the first robotic device and the second robotic device are surface cleaning robotic devices with a functionality comprising at least one of vacuuming and mopping.

19 Claims, 4 Drawing Sheets

(56) References Cited

U.S. PATENT DOCUMENTS

| | | | |
|---|---|---|---|
| 2009/0199264 A1* | 8/2009 | Lang | G06F 21/31 |
| | | | 726/1 |
| 2012/0192251 A1* | 7/2012 | Faiman | H04L 63/105 |
| | | | 726/3 |
| 2017/0146994 A9* | 5/2017 | Ammar | A47L 11/4061 |
| 2017/0364091 A1* | 12/2017 | Bennett | A47L 7/00 |
| 2018/0041343 A1* | 2/2018 | Chen | H04W 4/70 |
| 2018/0192845 A1* | 7/2018 | Gu | A47L 11/4091 |
| 2018/0215042 A1* | 8/2018 | Nakayama | G06F 3/0683 |
| 2018/0260615 A1* | 9/2018 | Chauhan | G06V 10/7635 |
| 2019/0369613 A1* | 12/2019 | Moon | G05D 1/0022 |
| 2020/0050215 A1* | 2/2020 | Kessler | G06F 3/0683 |
| 2020/0053091 A1* | 2/2020 | Childress | G06F 9/451 |
| 2021/0085146 A1* | 3/2021 | Cho | G06Q 40/08 |
| 2021/0114220 A1* | 4/2021 | Shin | A47L 9/2852 |

FOREIGN PATENT DOCUMENTS

| | | | | |
|---|---|---|---|---|
| JP | 2001195368 A | | 11/1999 | |
| JP | 2004295766 A | | 3/2003 | |
| WO | WO-2009067676 A1 * | | 5/2009 | G06K 9/00335 |

* cited by examiner

METHOD FOR ROBOTIC DEVICES TO INTERACT WITH EACH OTHER

CROSS-REFERENCE TO RELATED APPLICATIONS

This application is a Continuation of U.S. Non-Provisional patent application Ser. No. 16/568,367, filed Sep. 12, 2019, which is a Continuation of U.S. Non-Provisional patent application Ser. No. 15/986,670, filed May 22, 2018, which claims the benefit of U.S. Provisional Patent Application No. 62/509,585, filed May 22, 2017, each of which is hereby incorporated by reference.

FIELD OF THE DISCLOSURE

The present invention relates to robotic devices generally and more specifically to how robotic devices interact with each other.

BACKGROUND

Robotic devices have become increasingly common across a very broad spectrum ranging anywhere from artificial intelligence (AI) devices to mobile robotic devices that traverse an environment. In turn it is increasingly likely that robotic devices will interact with each other in their respective work environments. Therefore, it is important that these robotic devices be able to communicate with and build relationships with each other in order to increase working efficiency. It is further important for robotic devices to be able to attain levels of trust with each other in the interest of security and preventing hacking. The best approach is similar to how humans build a positive working relationship, where that working relationship is strengthened with each interaction.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a system for robotic collaboration, including: a first robotic device, including: a sensor; a processor; and a tangible, non-transitory, machine readable medium storing instructions that when executed by the processor effectuates first operations including: actuating, with the processor of the first robotic device, the first robotic device to execute a first part of a cleaning task; and transmitting, with the processor of the first robotic device, information to the processor of a second robotic device upon completing the first part of the cleaning task; and a second robotic device, including: a sensor; a processor; and a tangible, non-transitory, machine readable medium storing instructions that when executed by the processor effectuates second operations including: receiving, with the processor of the second robotic device, the information transmitted from the processor of the first robotic device; and actuating, with the processor of the second robotic device, the second robotic device to execute a second part of the cleaning task upon receiving the information; wherein the first robotic device and the second robotic device are surface cleaning robotic devices with a functionality comprising at least one of vacuuming and mopping.

Included is a method for a first robotic device to collaborate with a second robotic device, including: actuating, with a processor of the first robotic device, the first robotic device to execute a first part of a cleaning task; transmitting, with the processor of the first robotic device, information to a processor of the second robotic device upon completion of the first part of the cleaning task; receiving, with the processor of the second robotic device, the information transmitted from the processor of the first robotic device; and actuating, with the processor of the second robotic device, the second robotic device to execute a second part of the cleaning task upon receiving the information; wherein the first robotic device and the second robotic device are surface cleaning robotic devices with a functionality comprising at least one of vacuuming and mopping; and the information includes: an instruction to execute the second part of the cleaning task or a notification that the first part of the cleaning task is complete; and an identification of areas within which the first part of the cleaning task was executed or an identification of one or more areas to execute the second part of the cleaning task within.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION OF SOME EMBODIMENTS

Figure 1:
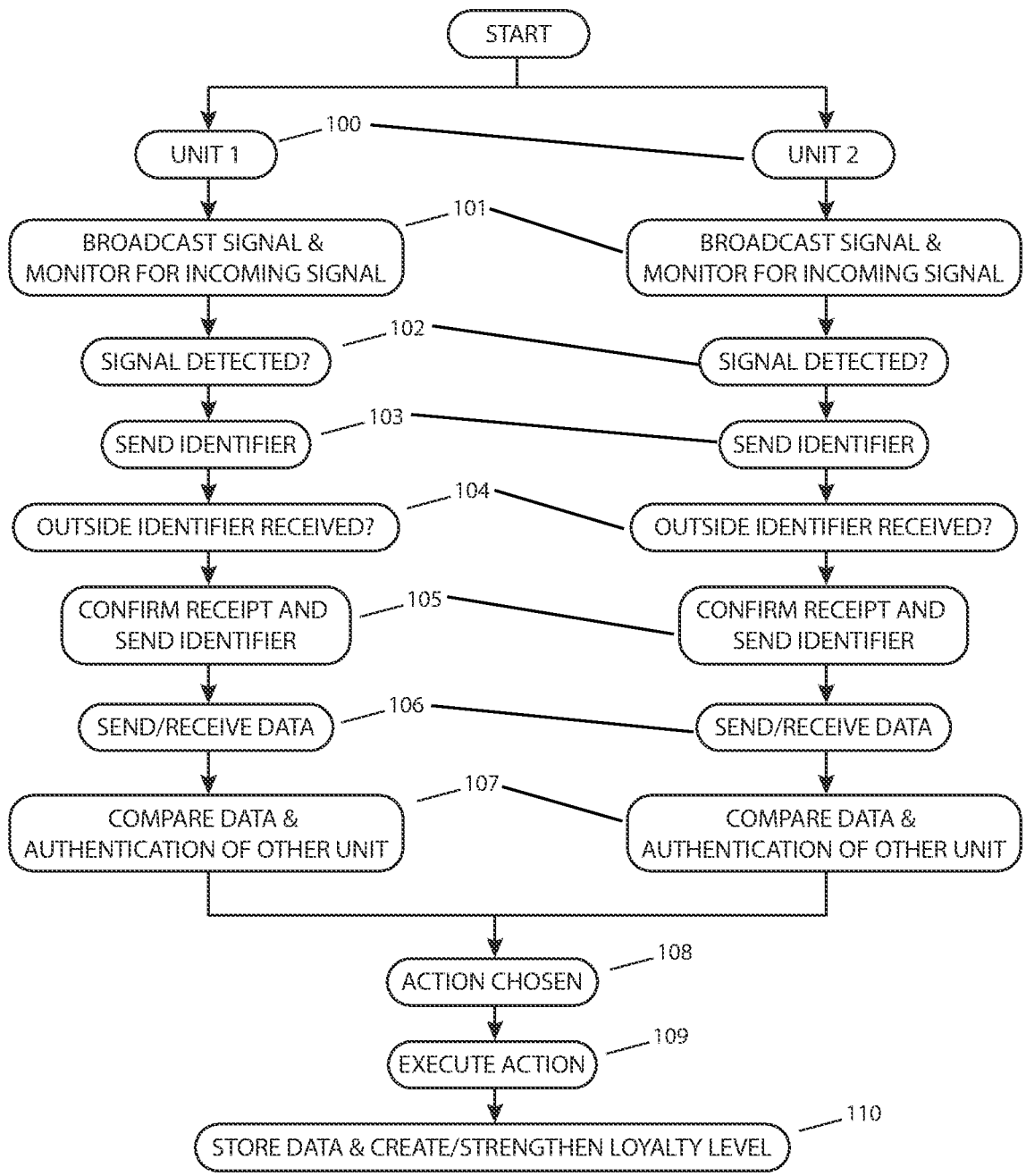
FIG. 1 illustrates the process by which two robotic devices establish and strengthen a relationship with each other, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include a method for robotic devices to establish a relationship with each other over a period of time via a loyalty index. In some embodiments, the loyalty index is created and achieved over a period of time and is either strengthened or weakened with each additional encounter. In some embodiments, the level of loyalty a robotic device has achieved with another device is built on the authentication process between the robotic devices. As each robotic device encounters and interacts with each other they authenticate each other. With each successful authentication of a robotic device, that robotic device's loyalty metric will increase. In some embodiments, the authentication between the robotic devices along with results occurring from the encounter will determine how the robotic devices interact with each other in the future.

In some embodiments, the loyalty index achieved by a robotic device with another robotic device changes with time. In some embodiments, the level of loyalty is determined by the number of times the robotic devices have authenticated each other and the interactions that have occurred each time. Some robotic devices are able to give commands to or can collaborate with other robotic devices on a given project in order to achieve the goal of that project. For example, a command robot such as an AI robotic device may be able to give commands to a laborer robotic device such as a mobile robotic vacuum and may be able to order that mobile robotic vacuum to clean a room or complete a task. As another example, if there are multiple robotic vacuums in the same area, those robotic vacuums may share the burden of completing a work task in order to complete the task in a more quick and efficient manner. In some embodiments, the level of loyalty previously achieved between these robotic devices determines how they will be able to interact with each other. In some embodiments, when the robotic devices operate, they scan the room. In some embodiments, if another robotic device is identified the two will exchange information and authenticate each other with a unique signature in order to identify each other in the future. In some embodiments, with each encounter, the exchange of information will continue as will the authentication. In some embodiments, with each authentication, the loyalty level between the devices is increased thereby increasing the trust the devices have with each other and potentially unlocking the ability to interact with each other in new ways if a new loyalty index threshold has been reached.

In some embodiments, the loyalty index will determine what actions may be conducted between robotic devices. A low loyalty index may result in two robotic devices merely exchanging information and authenticating each other while a high loyalty index may result in the two robotic devices collaborating on a work order with each other or one robotic device giving commands to another robotic device.

In some embodiments, the loyalty level of a robotic device with another robotic device may be lowered or raised when a robotic device fails or achieves a stated goal. For example, a first robotic device is an AI agent that commands other robotic devices and it commands a robotic vacuum to vacuum the hallway, if the robotic vacuum fails to vacuum the hallway or does a poor job the first robotic device may learn that the robotic vacuum is not very reliable thereby penalizing the mobile robotic vacuum by lowering the loyalty level. Alternatively, if the robotic vacuum succeeds in cleaning the hallway then the loyalty level may be increased.

In one embodiment of the invention, robot devices work with each other over time, establishing a bond such that they are able to rely on each other more each time. This is achieved by connectivity and authentication between robotic devices over time, thus establishing a bond. The robotic devices work together collaboratively by sharing information with each other and learning from each other. While robotic devices may learn from a user, they also learn from each other, and through repeated interactions and continued learning from each other, they create a strong bond whereby they can rely on each other for certain functionalities. In some embodiments, as the robotic devices interact with each other over time, they come to rely on each other. For example, Robot 1 is a voice activated AI robotic device that can give commands to other robotic devices. If a user tells Robot 1 "robot vacuum, vacuum the rug in the living room", Robot 1 will search for a robotic vacuum, referred to as Robot 2. Robot 1 will connect with Robot 2 and they will share their information and authenticate each other. Robot 1 will give Robot 2 the order from the user to clean the rug in the living room. Over time, as Robot 1 and Robot 2 continue to interact, Robot 1 will know that Robot 2 conducts cleaning functions, such as sweeping and mopping. Thus, after repeated interactions of this nature, if a user states a more nonspecific command such as "clean the kitchen floor" Robot 1 will know that it can rely on Robot 2 to conduct such action even though the user did not specify which robotic device they wished to clean the kitchen floor.

In some embodiments, the loyalty index between the robotic devices will determine what level of ability the robotic devices will have in interacting with each other. In some embodiments, a certain loyalty index threshold may be required in order for robotic devices to be able to access certain features, functionalities, clearance, give commands or the like with another robotic device. In some embodiments, if a particular threshold of the loyalty is not achieved between the robotic devices then the robotic devices will not be able to conduct a given interaction with each other until a minimum threshold of loyalty is achieved between the devices for that particular interaction. For example, a command robot at a level 1 loyalty index with a laborer robot may not be able to give particular commands to that laborer robot until it achieves a loyalty index at threshold 2. As the two robotic devices interact the loyalty index may be increased, at which point the command robot will be able to give additional commands to the laborer robotic device.

In some embodiments, the loyalty index may be considered as varying threshold levels. With each encounter a loyalty level may increase, but it may take a period of time, a number of interactions or a combination of both in order for the loyalty level to increase enough that a new loyalty index threshold level has been achieved.

In some embodiments, when multiple robotic devices interact with each other, the robotic device with the highest loyalty level will have seniority. In essence the robotic device with the highest loyalty level will have the highest level of trust. For example, a first robotic device has a higher loyalty level with a second robotic device than a third robotic device has with the second robotic device. The first robotic device may be able to access features or place orders of operation for the second robotic device that the third robotic device will not be able to. In order to countermand an order from the first robotic device, the third robotic device would have to achieve a higher loyalty level than that of the first robotic device which would require time and more encounters between the two devices.

In some embodiments, the loyalty index acts as a security measure. The loyalty index requires that robotic devices interact with each other. This prevents a new robotic device from achieving an undesirable result with another robotic device. By requiring a threshold level of loyalty, a new robotic device will not be able to hack into another robotic device as the new robotic device will not be recognized and will have a very low loyalty level in the loyalty index. Further a new robotic device may not be able to give an order to another robotic device until it has achieved a minimum threshold level of loyalty, thereby requiring many interactions between the devices over a period of time in order to be able to give the robotic device the command. Further, the new robotic device will not be able to countermand the orders given by a robotic device with a higher level of loyalty. The loyalty index thereby ensures that it will be extremely time consuming and burdensome for robotic devices to achieve undesirable results. Further, by requiring a certain loyalty level of trust between devices, it will make it much more difficult for a human user or robotic device to hack into another robotic device. For example, a user wishes to hack into a first robotic device by utilizing a second robotic device. In order to be able to access certain features, the second robotic device will have had to have achieved a certain threshold of loyalty in order for the second robotic device to even be able to access certain features. Otherwise the advances of the first robotic device would be rebuffed or denied. The same example holds true for an autonomous robotic device that would attempt to hack into another robotic device. If the level of loyalty is not achieved, the advance will be rebuffed or denied.

In some embodiments, the period of time it takes a robotic device to achieve a level of loyalty is variable and is not of a set period of time. In some embodiments, the number of interactions required to increase a level of loyalty is variable and is not a set number of interactions.

In some embodiments, a type of memory storage, proposed in U.S. patent application Ser. No. 14/820,505 called Time Access Memory (TAM) may be utilized. TAM, is a read-only memory in which memory cells are associated with successive time slots. Each memory cell is usable only within its time slot, after which point the memory cell, if not used, is permanently filled with junk data and becomes unwritable. The next memory cell becomes active in the next time slot, and may be filled only during that time slot. As the process continues, memory cells are either written with data during the time slot, or filled with junk data, either way, memory cells whose time slots have passed are unchangeable. This in turn means that a first robotic device cannot hack into a second robotic device and overwrite data from an interaction the second robotic device had with a third robotic device.

In some embodiments, a chain of command will exist. The chain of command ensures that the robotic device with the highest level of loyalty will be able to countermand orders given by a robotic device with a lower level of loyalty. For example, in a situation with military robots, the higher the rank of the military robotic device, the higher the level of loyalty. If a medium tiered military robotic device has given a command, and a senior military robotic device has given a command that countermands that of the medium tiered robotic device, that command given by the senior robotic device will be used while the other order is ignored.

In some embodiments, robotic devices do not need to be previously acquainted with each other, previously paired, or introduced by a user in order to interact with each other for a first time. So long as the robotic devices are able to connect, interact, and share information with each other, this will suffice. In some embodiments, the robotic devices will have the ability to scan the environment in order to search for other robotic devices in the area including newly introduced robotic devices that have not been acquainted with each other for a first time. For example, upon receiving a voice command to turn on a hot shower for a first time, the AI device may scan the home and find a device that has that functionality. So long as the two devices are able to exchange information with each other they will be able to rely on each other and create a working relationship. In some embodiments, devices are able to form connections with devices not introduced to them by a user.

Further, the robotic devices do not need to have similar functions, the functionalities of the different robotic devices can be completely separate and distinct from each other. In some embodiments, when robotic devices interact with each other, they will store the information regarding the abilities of the other robotic device in order to understand how to interact with that robotic device in the future. Each time a new task is designated requiring a particular interaction between robotic devices, the information is stored and the bond is strengthened with each successive interaction.

In some embodiments, robotic devices will be able to form a connection with other robotic devices that have functionalities that are completely separate and distinct from each other. For example, a smart computer may receive a voice command (e.g., from a user) to make a pot of coffee. In this example, the computer may scan the area for a device that has the coffee making functionality and interact with it in order to relay the instruction. The computer does not have the functionality to make the cup of coffee, but by scanning the area and finding a device it can delegate that task to, the computer has created a new connection with a device that can. The smart computer will store this information and any time that the smart computer receives a voice command to make a cup of coffee, the computer may rely on and connect with the coffee making device in order to supply the cup of coffee. In this embodiment, while the device has the ability to scan, find and build a relationship with a previously unknown device, the two devices do not need to have similar functionalities or capabilities; they simply need to be able to connect with each other. The devices can have completely separate and distinct functionalities or capabilities in terms of the tasks they are able to perform.

In some embodiments, different types of robotic devices may interact with each other such as a robotic device that issues commands and a robotic device that enacts those commands. In some embodiments, varying levels of loyalty may be required in these interactions in order for a command robot to be able to order particular commands. For example, in a warehouse run by autonomous robots a first robotic device is a command robot acting as a senior supervisor, a second robotic device acts as an intermediate supervisor, and then a third robotic device is a laborer. The first robotic device having already established a higher level of loyalty with the third robotic device will be able to give more commands than the second robotic device will be able to as it will have established a higher loyalty level previously. For example, the first robotic device may be able to order the third robotic device to handle hazardous materials while the second robotic device may only be able to order the third robotic device to handle normal materials.

In some embodiments, a robotic device may be given a starting level of loyalty with another robotic device, which is paired ahead of time between the robotic devices. In such a situation this threshold of loyalty can vary and is not limited to the lowest possible threshold. For instance, if there are 5 thresholds of loyalty each with different abilities to give commands, a first robotic device may be paired in advance with a second robotic device to give commands to the second robotic device at a threshold of 2 out of 5.

In some embodiments, a user can establish a level of loyalty with a robotic device as well. Each time that a user interacts with a robotic device, the user is authenticated. As the user's loyalty level is established and increases over a set period of time and number of interactions they may achieve thresholds of ability over the robotic device, thereby achieving the ability to access new features of the robotic device. In some embodiments, the robotic device will authenticate the user utilizing methods such as a palm scanner, DNA, retinal scan, voice capture and the like methods.

In embodiments, authentication acts as a security feature. By authenticating the robotic device to a person or second robotic device, it is much more difficult for another robotic device or person to override the authentication and take control of the robotic device. For instance, a user may enjoy using an AI device for shopping or playing music and may not want any other person to use the AI device for these purposes. The user may build a strong relationship with the AI device over time to have a strong authentication, each successive connection between the user and AI device strengthening the bond. Only someone with a stronger bond or authentication to the AI device would be able to override a command provided to the AI device by the user limiting the access to shopping and music functionalities to the user themselves. In embodiments, the robotic device prefers the person or device that has the strongest bond to it.

In some embodiments, the robotic devices may share the loyalty level of the loyalty index they have with another robotic device to additional robotic devices in the work area in order to assist the additional robotic devices with identifying reliable robotic devices in the work environment.

FIG. 1 depicts the process by which two robotic devices establish and strengthen a relationship through the loyalty index, according to some embodiments. In some embodiments, robotic device 1 and robotic device 2 (100), will broadcast signals and monitor for incoming signals (101). In some embodiments, if a signal is detected (102), then an identifying signal is sent out (103). In some embodiments, if an outside identifying signal is received (104), then a confirmation is sent and another identifying signal is sent out (105). In some embodiments, data is exchanged by the two devices (106) and, in some embodiments, the data is compared and the other device is authenticated (107). In some embodiments, an action is chosen (108) and that action is executed (109). In some embodiments, the data is stored and the loyalty index between the robots is created and strengthened or weakened (110).

Figure 2:
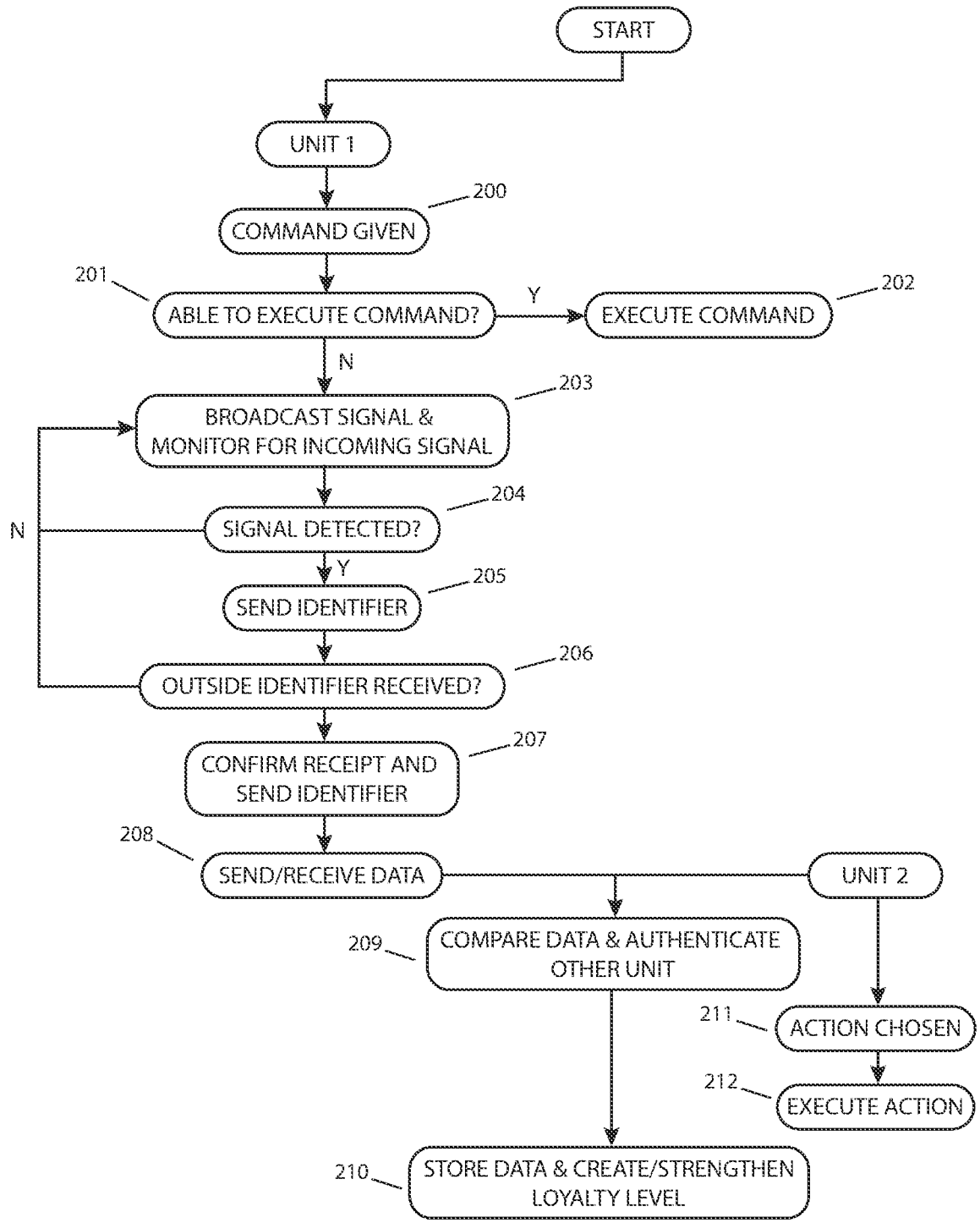
FIG. 2 illustrates the process by which a robotic device connects with and establishes a loyalty level with another device, of which it was previously not introduced, in order to carry out tasks it is unable to execute, according to some embodiments.

FIG. 2 depicts the process by which a robotic device connects with and establishes a loyalty index with another robotic device to which it was not previously introduced in a situation where the first robotic device is unable to perform certain functions and is therefore searching for a second robotic device that can perform those functions. Robotic device 1 is given a command (200), which, in some embodiments, it will determine whether or not it is capable of executing (201). In some embodiments, if capable of doing so, it will execute that function (202). In some embodiments, if unable to carry out such a command, robotic device 1 will search for other robotic devices that may be able to do so. In some embodiments, robotic device 1 will thus broadcast a signal and monitor for incoming signals (203) from other robotic devices. In some embodiments, if a signal from a second robotic device is received (204), then an identifying signal is sent out (205) by robotic device 1. In some embodiments, if an outside identifying signal is received (206) from robotic device 2, receipt is confirmed and, in some embodiments, another identifying signal is sent out (207). In some embodiments, the data is exchanged between robotic device 1 and 2 (208). In some embodiments, the data is compared and the robotic devices authenticate each other (209). In some embodiments, the data is stored and a loyalty index level is created or strengthened if one already exists between the devices (210). In some embodiments, robotic device 2 will choose the action appropriate to the situation (211) and execute that action (212). In some embodiments, this data is also stored and helps to strengthen the loyalty level (210) for future use.

Figure 3:
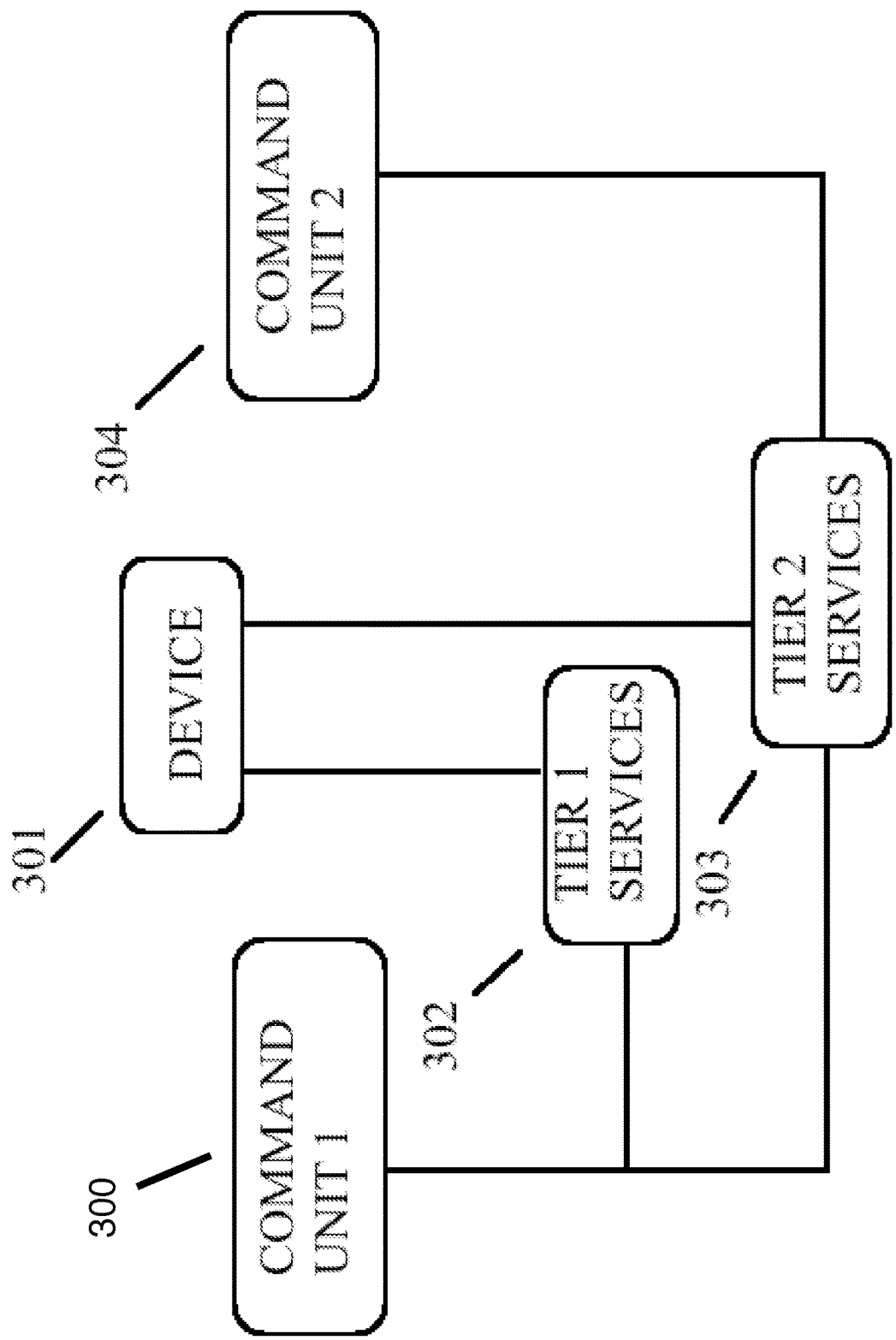
FIG. 3 illustrates an example of a chain of command, where a first robotic device is capable of accessing all functions of second robotic device but a third robotic device is only able to access certain functions, according to some embodiments.

FIG. 3 depicts an example of a chain of command scenario involving multiple robotic devices. In this example one robotic device called command unit 1 (300) is able to give multiple types of commands to a second robotic device (301) including Tier 1 services (302) as well as Tier 2 services (303), while a third robotic device called command unit 2 (304) is only able to give particular commands from Tier 1. In this depiction command unit 1 has a higher loyalty index level with robotic device 2 than command unit 2 has with robotic device 2. Further, if command unit 1 gives a command contrary to a command given by command unit 2, robotic device 2 will ignore the command given by command unit 2 and will enact the command given by command unit 1 instead.

Figure 4A:
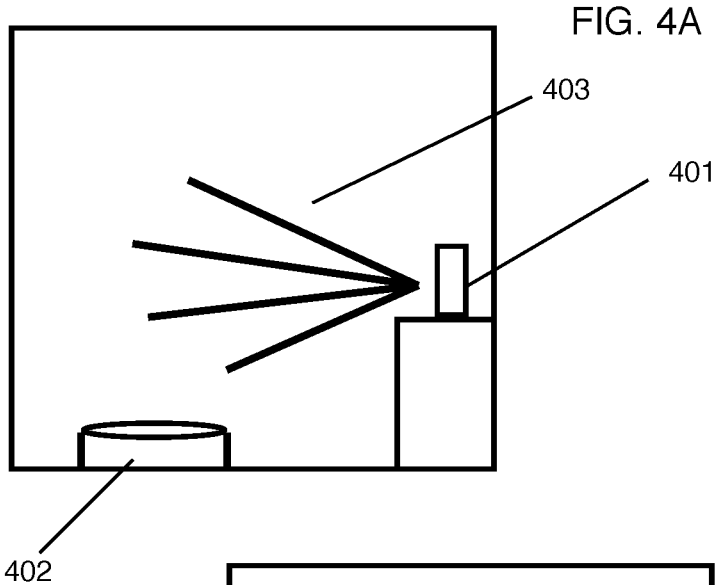
FIGS. 4A-4C depict the process by which a robotic device searches for, connects, exchanges information, and authenticates with another robotic device, according to some embodiments.
Figure 4B:
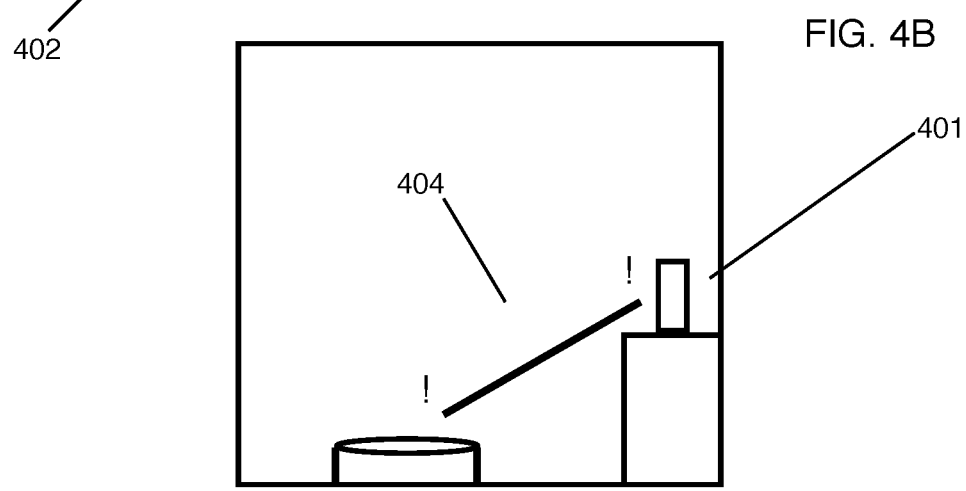
Figure 4C:
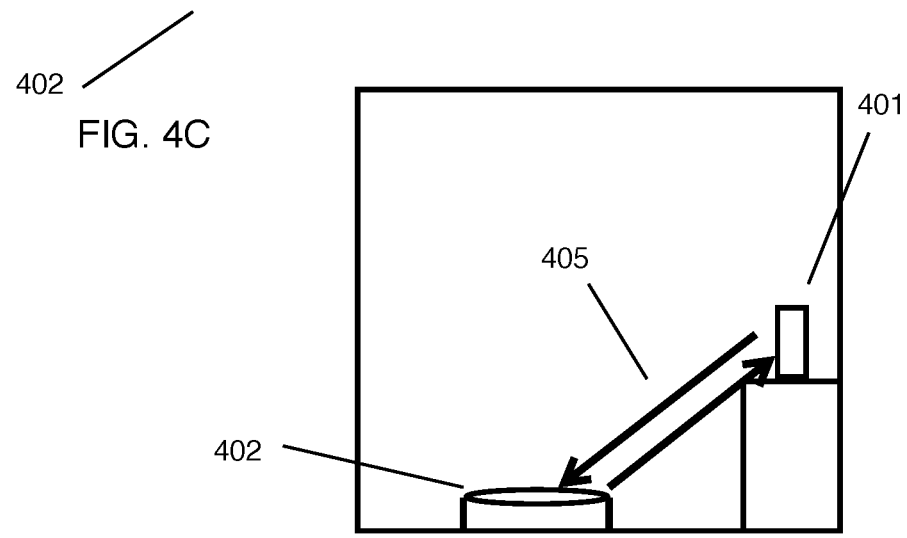

FIGS. 4A-4C depict the process by which a robotic device searches for, connects, exchanges information, and authenticates with another robotic device.

While this invention has been described in terms of several embodiments, there are alterations, permutations, and equivalents, which fall within the scope of this invention. It should also be noted that there are many alternative ways of implementing the methods, devices and apparatuses of the present invention. Furthermore, unless explicitly stated, any method embodiments described herein are not constrained to a particular order or sequence. Further the Abstract is provided herein for convenience and should not be employed to construe or limit the overall invention, which is expressed in the claims. It is therefore intended that the following appended claims to be interpreted as including all such alterations, permutations, and equivalents as fall within the true spirit and scope of the present invention.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:
1. A system for robotic collaboration, comprising:
a first robotic device, comprising:

a sensor;
a processor; and
a tangible, non-transitory, machine readable medium storing instructions that when executed by the processor of the first robotic device effectuates first operations comprising:
actuating, with the processor of the first robotic device, the first robotic device to execute a first part of a cleaning task; and
transmitting, with the processor of the first robotic device, information to a processor of a second robotic device upon completing the first part of the cleaning task; and
the second robotic device, comprising:
a sensor;
a processor; and
a tangible, non-transitory, machine readable medium storing instructions that when executed by the processor of the second robotic device effectuates second operations comprising:
receiving, with the processor of the second robotic device, the information transmitted from the processor of the first robotic device; and
actuating, with the processor of the second robotic device, the second robotic device to execute a second part of the cleaning task upon receiving the information;
wherein:
the first robotic device and the second robotic device are surface cleaning robotic devices with a functionality comprising at least one of vacuuming and mopping;
a memory of the first robotic device and a memory of the second robotic device comprise time access memory;
at each time slot a corresponding memory cell is written with data or junk; and
memory cells whose corresponding time slots have passed are unchangeable and cannot be overwritten.

2. The system of claim 1, wherein the processor of the first robotic device and the processor of the second robotic device each establish a relationship loyalty level with one another, wherein each processor updates a respective relationship loyalty level after every interaction between the first robotic device and the second robotic device to either strengthen or weaken the relationship loyalty level based on an interaction outcome.

3. The system of claim 2, wherein the interaction outcome comprises an actual coverage of an area relative to a desired coverage of an area.

4. The system of claim 2, wherein:
a first relationship loyalty level permits an exchange of information between the first robotic device and the second robotic device and prevents from providing commands; and
a second relationship loyalty level, higher than the first relationship loyalty level, additionally permits collaboration between the first robotic device and the second robotic device.

5. The system of claim 1, wherein the first robotic device is actuated to execute the first part of the cleaning task upon receiving a voice command to execute the cleaning task.

6. The system of claim 1, wherein the processor of the first robotic device actuates the first part of the cleaning task after receiving instructions to execute the cleaning task from a third robotic device.

7. The system of claim 6, wherein the third robotic device instructs the processor of the first robotic device to complete the first part of the cleaning task after receiving a voice command from a user to execute the cleaning task.

8. The system of claim 7, wherein:
the voice command identifies the first robotic device as the robotic device that is to perform the cleaning task; and
the third robotic device scans and searches its surroundings for the first robotic device.

9. The system of claim 1, wherein:
the processor of the first robotic device learns the second robotic device has a cleaning functionality based on previous encounters with the second robotic device; and
the processor of the first robotic device particularly scans and searches its surroundings for the second robotic device upon receiving a voice command relating to cleaning based on knowledge of the second robotic device having the cleaning functionality.

10. The system of claim 1, wherein the first operations further comprise:
receiving, by the processor of the first robotic device, a command from another robotic device or a user;
determining, by the processor of the first robotic device, whether the first robotic device has a functionality required to execute the enter command before broadcasting signals to search for a robotic device with the functionality required to execute at least a portion of the command;
executing, by the first robotic device, the command when the processor of the first robotic device determines it has the functionality required to execute the command; and
searching, by the processor of the first robotic device, for a robotic device with the functionality required to execute at least a portion of the command when the first robotic device does not have the functionality required to execute the entire command, comprising:
broadcasting, by the processor of the first robotic device, signals;
receiving, by the processor of the second robotic device, the incoming signals transmitted from the first robotic device;
transmitting, by the processor of the second robotic device, a second robotic device identifying signal to the first robotic device;
receiving, by the processor of the first robotic device, the second robotic device identifying signal from the second robotic device;
transmitting, by the processor of the first robotic device, a confirmation signal and a first robotic device identifying signal to the second robotic device; and
authenticating and exchanging information between the processor of the first robotic device and the processor of the second robotic device.

11. The system of claim 1, wherein the processor of the first robotic device and the processor of the second robotic device store information relating to a functionality of robotic devices with which they previously collaborated.

12. The system of claim 1, wherein a first user provides a setting to the first robotic device that prevents any other user from accessing cleaning functions of the first robotic device.

13. The system of claim 12, wherein a second user overrides the setting by establishing a relationship loyalty level between the second user and the first robotic device that exceeds a relationship loyalty level between the first user and the first robotic device.

14. The system of claim 1, wherein the first operations further comprise transmitting, with the processor of the first robotic device, additional information to the processor of the second robotic device, wherein the processor of the second robotic device receives the additional information and determines an action based on at least a portion of the additional information.

15. The system of claim 1, wherein the information comprises:
   an instruction to execute the second part of the cleaning task or a notification that the first part of the cleaning task is complete; and
   an identification of areas within which the first part of the cleaning task was executed or an identification of one or more areas to execute the second part of the cleaning task within.

16. The method of claim 15, wherein the processor of the first robotic device and the processor of the second robotic device each establish a relationship loyalty level with one another, wherein:
   each processor updates a respective relationship loyalty level after every interaction between the first robotic device and the second robotic device to either strengthen or weaken the relationship loyalty level based on an interaction outcome; and
   the interaction outcome comprises an actual coverage of an area relative to a desired coverage of an area.

17. The method of claim 15, wherein:
   the processor of the first robotic device actuates the first robotic device to complete the first part of the cleaning task after receiving instructions to execute the cleaning task from a third robotic device;
   the third robotic device instructs the processor of the first robotic device to complete the first part of the cleaning task after receiving a voice command from a user to execute the cleaning task;
   the voice command identifies the first robotic device as the robotic device that is to perform the cleaning task; and
   the third robotic device scans and searches its surroundings for the first robotic device.

18. The method of claim 15, further comprising:
   receiving, by the processor of the first robotic device, a command from another robotic device or a user;
   determining, by the processor of the first robotic device, whether the first robotic device has a functionality required to execute the enter command before broadcasting signals to search for a robotic device with the functionality required to execute at least a portion of the command;
   executing, by the first robotic device, the command when the processor of the first robotic device determines it has the functionality required to execute the command; and
   searching, by the processor of the first robotic device, for a robotic device with the functionality required to execute at least a portion of the command when the first robotic device does not have the functionality required to execute the entire command, comprising:
      broadcasting, by the processor of the first robotic device, signals;
      receiving, by the processor of the second robotic device, the incoming signals transmitted from the first robotic device;
      transmitting, by the processor of the second robotic device, a second robotic device identifying signal to the first robotic device;
      receiving, by the processor of the first robotic device, the second robotic device identifying signal from the second robotic device;
      transmitting, by the processor of the first robotic device, a confirmation signal and a first robotic device identifying signal to the second robotic device; and
      authenticating and exchanging information between the processor of the first robotic device and the processor of the second robotic device.

19. A method for a first robotic device to collaborate with a second robotic device, comprising:
   actuating, with a processor of the first robotic device, the first robotic device to execute a first part of a cleaning task;
   transmitting, with the processor of the first robotic device, information to a processor of the second robotic device upon completion of the first part of the cleaning task;
   receiving, with the processor of the second robotic device, the information transmitted from the processor of the first robotic device; and
   actuating, with the processor of the second robotic device, the second robotic device to execute a second part of the cleaning task upon receiving the information;
   wherein:
      the first robotic device and the second robotic device are surface cleaning robotic devices with a functionality comprising at least one of vacuuming and mopping;
      a memory of the first robotic device and a memory of the second robotic device comprise time access memory;
      at each time slot a corresponding memory cell is written with data or junk; and
      memory cells whose corresponding time slots have passed are unchangeable and cannot be overwritten; and
      the information comprises:
         an instruction to execute the second part of the cleaning task or a notification that the first part of the cleaning task is complete; and
         an identification of areas within which the first part of the cleaning task was executed or an identification of one or more areas to execute the second part of the cleaning task within.

* * * * *